(12) United States Patent
Hartog

(10) Patent No.: US 8,013,986 B2
(45) Date of Patent: Sep. 6, 2011

(54) MEASURING BRILLOUIN BACKSCATTER FROM AN OPTICAL FIBRE USING CHANNELISATION

(75) Inventor: Arthur H. Hartog, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 238 days.

(21) Appl. No.: 12/438,072

(22) PCT Filed: Aug. 7, 2007

(86) PCT No.: PCT/GB2007/003014
§ 371 (c)(1),
(2), (4) Date: May 21, 2009

(87) PCT Pub. No.: WO2008/023143
PCT Pub. Date: Feb. 28, 2008

(65) Prior Publication Data
US 2010/0165327 A1   Jul. 1, 2010

(30) Foreign Application Priority Data

Aug. 24, 2006   (GB) .................................. 0616750.6

(51) Int. Cl.
*G01N 21/00*   (2006.01)
(52) U.S. Cl. ..................................................... 356/73.1

(58) Field of Classification Search .................... None
See application file for complete search history.

(56) References Cited

U.S. PATENT DOCUMENTS

| 5,949,533 A * | 9/1999 | Lee et al. ...................... 356/73.1 |
| 6,335,788 B1 * | 1/2002 | Uchiyama et al. ............ 356/73.1 |
| 6,380,534 B1 * | 4/2002 | Farhadiroushan et al. ........................ 250/227.14 |
| 6,674,928 B2 | 1/2004 | Johnson et al. |

FOREIGN PATENT DOCUMENTS

| EP | 0692705 A1 | 1/1996 |
| WO | 9909370 A1 | 2/1999 |
| WO | 03106929 A1 | 12/2003 |
| WO | 2005/106396 A2 | 11/2005 |

* cited by examiner

*Primary Examiner* — Tu Nguyen
(74) *Attorney, Agent, or Firm* — Brandon S. Clark; Rodney V. Warfford

(57) ABSTRACT

Methods and apparatus for measuring Brillouin backscattering from an optical fiber. A pulse of light with a first frequency is launched into an optical fiber. Backscattered light is received from the fiber, which includes Brillouin spectral line at a second frequency shifted from the first. The Brillouin spectral line varies with time and distance along the fiber. A signal representative of the backscattered light is obtained. The signal is divided into several components, each with a different frequency. The components are further treated, and one or more properties of the Brillouin spectral line are determined.

24 Claims, 3 Drawing Sheets

MEASURING BRILLOUIN BACKSCATTER FROM AN OPTICAL FIBRE USING CHANNELISATION

BACKGROUND OF THE INVENTION

1. Field of the Invention

The present invention relates to a method for measuring Brillouin backscattered light from an optical fibre used for optical time domain reflectometry.

2. Description of Related Art

Optical time domain reflectometry (OTDR) is a technique that uses optical fibre to make remote measurements of various parameters. A probe pulse of light is launched into an end of a fibre that is deployed through a region of interest, for example down an oil well. The pulse propagates along the fibre, and part of the light is backscattered from points along the length of the fibre and returns to the launch end, where it is detected. The propagation time to the scattering point and back is recorded as the light returns, so the location of the scattering point can be calculated using the speed of propagation in the fibre. Also, various physical parameters such as temperature, strain, and pressure have an effect on how the light is scattered, including producing Raman and Brillouin frequency shifts. The value of the parameters can be calculated from the size, width, and intensity of these frequency shifts. Thus, by making the appropriate conversion from time to distance, a map of the distribution of a physical parameter along the fibre length can be obtained.

In Brillouin-based OTDR, one or more Brillouin lines are measured in the scattered light spectrum. These lines are shifted in frequency from the frequency of the probe pulse. From a measured Brillouin spectrum, one can extract at least the intensity and width of the line or lines and the size of the frequency shift, and use this information to determine physical parameters along the fibre.

Conventionally, Brillouin signals have been measured by direct detection, where the Brillouin light is incident directly on a photodetector, or by heterodyne detection, in which the Brillouin signal is mixed with a signal from a local oscillator and the resulting difference frequency signal is passed for detection.

One measurement technique uses optical discrimination, in which an optical filter switches light between the two arms of a Mach-Zehnder interferometer, and an estimate of the central frequency of the Brillouin line is obtained from the relative intensities of the optical signals emerging from each arm [1]. A similar procedure relies instead on electrical discrimination [2].

A problem with discriminator-based techniques is the need to employ a wide input frequency spectrum to capture the full range of potential output signal frequencies. The necessary broad bandwidth tends to degrade performance.

Other techniques are based on frequency scanning and recording an intensity/time signal for each scan. For example, one may scan an optical filter across the expected frequency spectrum before passing the filtered light to a detector. The optical filter may be a Fabry-Perot interferometer that is scanned slowly compared with the pulse repetition frequency of the probe pulses. For each pulse a series of intensity measurements is made as a function of time/distance along the fibre, and may be further averaged over several pulses. A series is recorded for every position of the filter, from which a Brillouin spectrum for each location along the fibre can be constructed [3].

An alternative approach [4, 5] uses a microwave heterodyne method, in which the backscattered light is mixed on a photodiode, thus creating a beat frequency spectrum that shifts the information from the optical domain to the microwave domain. An electrical local oscillator is scanned in frequency and a microwave receiver section passes a fixed intermediate frequency that is further amplified, filtered and detected, thus creating a quasi-DC signal. The latter provides an indication of the power within the bandwidth of the system as a function of position along the fibre.

For these various scanning methods, the data acquisition time is typically slow, since the signals needs to be averaged in two dimensions. Depending on the sampling interval in the frequency offset domain and the span of frequencies to be covered, this can be a lengthy process during which essential but sparsely used information is acquired. A large frequency range must be looked at for each position along the fibre to ensure that the shifted frequency is found, but the frequency line itself occupies only a small part of that range. Measurements outside the line must be made to locate the line, but contain no information regarding the parameter being measured.

BRIEF SUMMARY OF THE INVENTION

Accordingly, a first aspect of the present invention is directed to a method for measuring Brillouin backscattering from an optical fibre, comprising: launching a probe pulse of coherent light with frequency $f_0$ into an optical fibre; receiving backscattered light from the optical fibre that includes at least one Brillouin spectral line at a frequency $f_B(t)$ shifted from $f_0$ by a Brillouin shift, the Brillouin spectral line varying with time/distance along the fibre; obtaining a signal representative of the received backscattered light; dividing the signal into a plurality of signal components each having a different frequency band and delivering each signal component to a detection channel; in each detection channel: detecting the signal component using a detector to generate an electrical signal; and digitizing the electrical signal using an analog to digital converter to sample the electrical signal and generate a sequence of digital samples representing the electrical signal; and processing the digital samples from the detection channels to determine one or more properties of the Brillouin spectral line of the received backscattered light as a function of time/distance along the optical fibre.

Dividing the Brillouin backscatter signal into multiple frequency components and detecting each component in one of a plurality of parallel detection channels allows the full frequency range of the Brillouin shift to be observed with one probe pulse, but without drawbacks associated with components capable of handling a broadband signal. Distributing the detection over many narrowband channels allows high performance narrowband components to be used, thus giving an accurate measurement. At the same time, the measurement is rapid because all frequencies are detected simultaneously, thus avoiding time-consuming frequency scanning.

The measurement may be made in the electrical regime, whereby the Brillouin backscatter is converted into an electrical signal prior to detection. Hence, in some embodiments, obtaining a signal representative of the received backscattered light comprises: providing coherent light at a frequency $f_1$; and mixing the received backscattered light at $f_B(t)$ with the coherent light at $f_1$ in an optical detector to generate a primary electrical signal at a difference frequency $\Delta F(t) = f_B(t) - f_1$, the primary electrical signal comprising the signal representative of the received backscattered light; and dividing the signal into a plurality of signal components comprising: dividing the primary electrical signal into a plurality of portions and difference frequency mixing each portion with a subsidiary electrical signal, each subsidiary electrical signal having a different constant frequency $f_{C_i}$ so that each portion acquires a frequency band. The difference frequency $\Delta F(t)$ may be less than 100 GHz.

A desired difference frequency $\Delta F(t)$ can be chosen according to the detection components available, by selection of the two optical frequencies. In some embodiments, $f_1$ may be equal to $f_0$. In such a case, the method may comprise generating probe pulses at the frequency $f_0$ and the coherent light at the frequency $f_1$ from a single optical source, the output of which is modulated to produce probe, pulses.

Alternatively, the method may comprise generating probe pulses from a first optical source and generating the coherent light at the frequency $f_1$ from a second optical source by modulating the output of one of the first optical source and the second optical source to generate modulation sidebands, and injection-locking the other of the first optical source and the second optical source to one of the modulation sidebands.

The method may further comprise, before the step of dividing the signal, mixing the primary electrical signal at the difference frequency $\Delta F(t)$ with a secondary electrical signal at a constant frequency $f_C$ to reduce the frequency of the primary electrical signal to a frequency $\Delta F_2(t)$ which is less than $\Delta F(t)$. This allows further modification of the difference frequency with regard to obtaining the most accurate and efficient detection with the components available. The frequency $\Delta F_2(t)$ may be less than 5 GHz.

As an alternative to detection of an electrical signal, the Brillouin backscatter may be detected directly as an optical signal. Therefore, in other embodiments, obtaining a signal representative of the received backscattered light comprises: using the received backscattered light as the signal representative of the received backscattered light; and dividing the signal into a plurality of signal components comprising: spectrally dispersing the received backscattered light into a plurality of components each having a different spectral profile defining its frequency band.

For the optical or electrical regime, the method may further comprise repeating the method for further probe pulses, where the step of processing the digital samples includes, for each detection channel, averaging the samples over a plurality of probe pulses, before determining the one or more properties of the Brillouin spectral line from the averaged samples.

The one or more properties of the Brillouin spectral line determined from the samples may include at least one of: the Brillouin frequency $f_B(t)$; the intensity of the Brillouin spectral line; and the linewidth of the Brillouin spectral line.

The method may further comprise calculating the value of one or more physical parameters to which the optical fibre is subject from the one or more determined properties of the Brillouin spectral line and converting time to distance along the optical fibre to obtain an indication of the distribution of the one or more physical parameters over the length of the optical fibre.

A second aspect of the present invention is directed to apparatus for measuring Brillouin backscattering from an optical fibre comprising: a first optical source operable to generate probe pulses of coherent light at a frequency $f_0$ and launch probe pulses into an optical fibre; a receiver operable to receive backscattered light from the optical fibre that includes at least one Brillouin spectral line at a frequency $f_B(t)$ shifted from $f_0$ by a Brillouin shift, the Brillouin spectral line varying with time/distance along the fibre, and to deliver a signal representative of the received backscattered light; a divider operable to divide the signal into a plurality of signal components each having a different frequency band and deliver each component to a detection channel, each detection channel comprising: a detector operable to detect the signal component and generate an electrical signal; and an analog to digital converter operable to digitize the electrical signal by sampling to generate a sequence of digital samples representing the electrical signal; and a processor operable to process the digital samples from the detection channels to determine one or more properties of the Brillouin spectral line of the received backscattered light as a function of time/distance along the fibre.

BRIEF DESCRIPTION OF THE DRAWINGS

For a better understanding of the invention and to show how the same may be carried into effect, reference is now made by way of example to the accompanying drawings in which.

DETAILED DESCRIPTION OF THE INVENTION

The present invention proposes using a plurality of parallel detection channels to measure backscattered light containing a Brillouin spectral component received from an optical time domain reflectometry optical fibre, so that the characteristics of the Brillouin shift can be ascertained from measurements recorded across the channels. Each channel covers a separate but adjacent frequency band or range, with all the bands together covering the total possible frequency range of the anticipated Brillouin shift. Dividing the detection into parallel channels allows the use of relatively narrowband components, thus addressing performance problems associated with existing broadband systems that attempt to measure the full frequency range at once for each probe pulse. However, the full frequency range is still covered for a single pulse, so that, in addition, the present invention significantly reduces measurement times compared to conventional scanning techniques that scan a narrowband detection window over the full frequency range during the course of multiple probe pulses.

FIRST EXAMPLE EMBODIMENT

Figure 1:
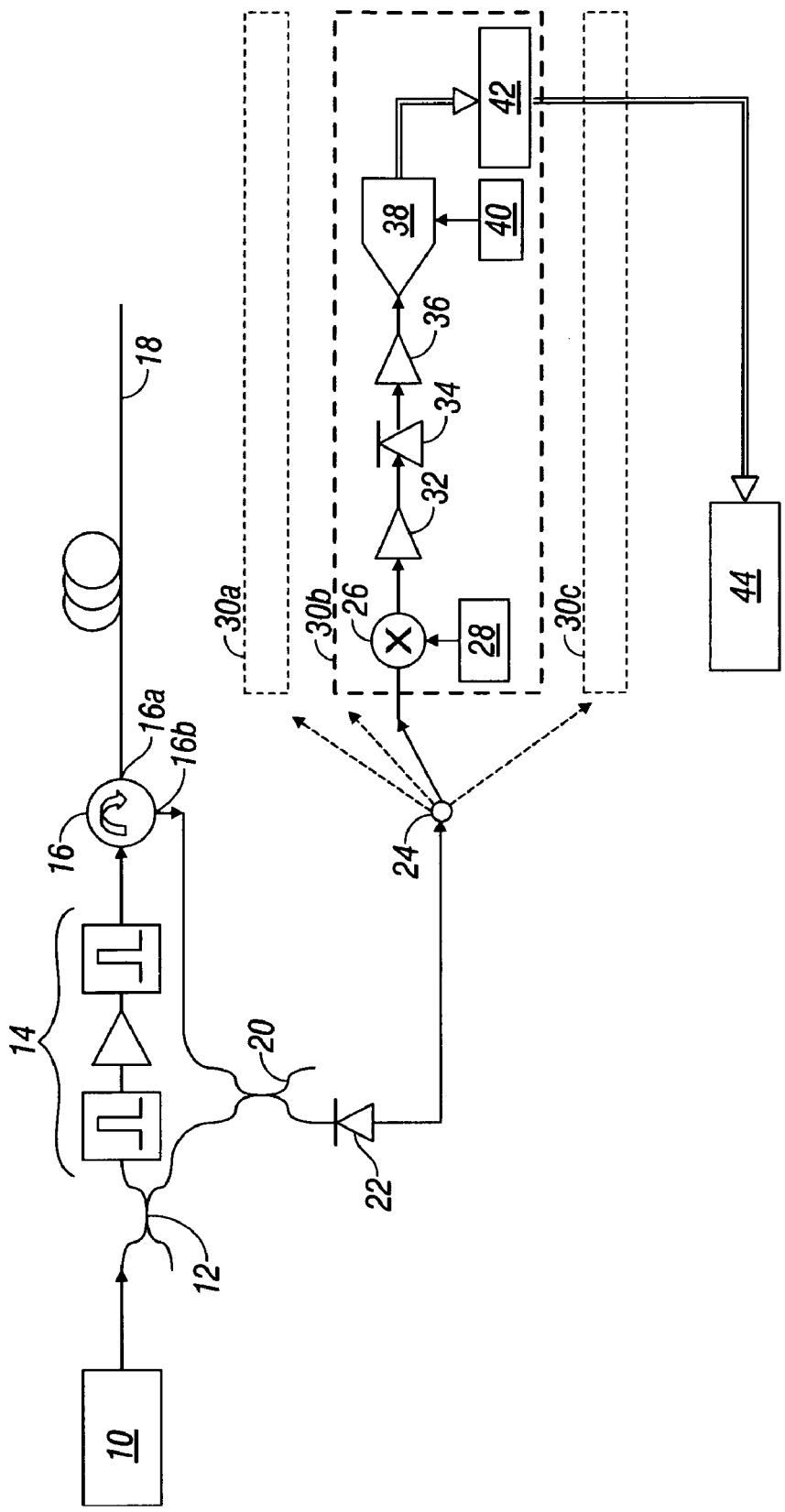
FIG. 1 shows a schematic representation of apparatus for carrying out a Brillouin backscatter measurement in accordance with a first embodiment of the present invention.

FIG. 1 shows a schematic representation of apparatus for implementing a measurement method according to an embodiment of the present invention. This example uses electrical detection in the parallel measurement channels.

An optical source 10 operable to generate narrow-band coherent light (such as a laser) produces an output beam at a frequency $f_0$. The beam is directed into a beam splitter 12 (such as a 3 dB fibre splitter) that divides the output beam into a first part for launching into a deployed optical fibre 18, and a second part to be mixed with light received back from the optical fibre 18. The first part passes through a pulse forming unit 14 that produces optical probe pulses of a desired repetition frequency, pulse duration, and power, suitable for probing of the deployed optical fibre 18 to obtain Brillouin backscatter. In this example the pulse forming unit 14 comprises two pulse generators/gates with an amplifier between. However, any required combination of optical components can be used to create the necessary output. The pulses at $f_0$ are then sent to an optical circulator 16 having a first port 16a to which is connected the deployed optical fibre 18. The pulses can thereby be launched into the optical fibre 18. Alternatively, although an optical circulator is preferred, the optical circulator 16 may be replaced by a power splitter(s) or active device(s), such as an acousto-optic deflector(s).

A second port 16b of the optical circulator 16 is connected to a beam combiner 20 (such as a 3 dB fibre splitter), which is also connected to receive the second part of the beam from the optical source 10 from the beam splitter 12. An output of the beam combiner 20 is arranged to direct light onto an optical detector 22 such as a fast photodiode.

In use, therefore, the optical source 10 generates an output beam that is divided into two parts. A first part passes through the pulse forming unit 14 to form probe pulses, which are launched into the optical fibre 18 via the first port 16a of the optical circulator 16. Each pulse propagates along the length of the optical fibre 18, with Brillouin backscatter being produced during propagation, from each part of the optical fibre 18. The backscatter returns to the launch end of the optical fibre 18, where it is received by the optical circulator 16 at the first port 16a, and directed out of the second port 16b and into the beam combiner 20. Optionally, the received backscatter may be amplified before it reaches the beam combiner 20. In the beam combiner 20, the received Brillouin backscatter combines with the second part of the output beam from the optical source 10, which is at frequency $f_0$. The Brillouin backscatter includes at least one Brillouin spectral line at a Brillouin frequency $f_B(t)$ shifted from $f_0$, where the time variation arises from the time-distance correspondence for light returned from the optical fibre 18 and the variation in the Brillouin shift with location along the fibre (different parts of the fibre being at different temperatures, strains, etc.). The combined light mixes together (frequency mixing) and is directed onto the optical detector 22, which has an electrical output representative of light incident upon it. The frequency mixing therefore produces an electrical signal at a difference frequency $\Delta F(t)=f_B(t)-f_0$. This primary electrical signal is a signal that is representative of the received backscattered light.

Although in this example the received Brillouin light is mixed with light from the optical source 10 at $f_0$ to produce the primary electrical signal, a separate optical source could be used, either generating light at a different optical frequency $f_1$, or also generating at the frequency $f_0$ ($f_1=f_0$). If a separate optical source is used, the first optical source producing light for the probe pulses may have its output modulated to generate modulation sidebands, and a second optical source for generating the light at $f_1$ to be mixed with the received Brillouin light is injection locked to one of the modulation side bands. Yet another approach is to modulate at least part of the output of a source at frequency $f_0$ so as to produce at least one sideband at frequency $f_1$. Conversely, the second optical source may be modulated and the first optical source injection-locked thereto. While a single optical source is convenient and compact, two separate optical sources offer independent control of the frequency and intensity of the light at the two frequencies. In all cases, the effect is the same: the mixing of the two optical signals produces a primary electrical signal having a lower frequency than the optical signals. Preferably, $f_0$ and $f_1$ are chosen so that the frequency of the primary electrical signal, at the difference frequency $\Delta F(t)=f_B(t)-f_1$ (where $f_1$ may equal $f_0$) is less than about 100 GHz, i.e., the primary electrical signal is in the microwave domain. For example, if $f_0=f_1=193.4$ THz, the difference frequency will be around 11 GHz.

The purpose of the difference frequency mixing to produce the primary electrical signal is to convert the Brillouin backscatter, being an optical signal, into an electrical signal that retains the frequency information of the Brillouin line so that electrical components may be used in the subsequent channelization and detection.

To this end, the primary electrical signal at $\Delta F(t)$ is directed from the optical detector 22 to an electrical signal splitter 24 configured to divide the primary electrical signal into a plurality of signal portions, each containing an approximately equal share of the total signal power. Each portion is delivered to a subsidiary electrical frequency mixer 26, each of which also receives a subsidiary electrical signal from an associated local electrical oscillator 28. Each local electrical oscillator 28 generates a subsidiary electrical signal having a different constant frequency $f_{Ci}$. Thus, each portion of the primary electrical signal undergoes difference frequency mixing in an electrical frequency mixer 26 which outputs an electrical signal at a difference frequency $\Delta F_{2i}(t)=\Delta F(t)-f_{Ci}$. By appropriate selection of the values of the various $f_{Ci}$, a different segment of the total frequency bandwidth of the primary electrical signal is selected for each portion of the primary electrical signal. In this way, the incoming primary electrical signal is divided into a plurality of signal components, each having a different narrow frequency band where the frequency bands together cover the whole broad frequency range of the difference frequency $\Delta F(t)$, and hence include the total frequency information of the Brillouin backscatter.

The plurality of outputs from the electrical frequency mixers 26, being the frequency components having the form of electrical signals, are now ready for detection, with each being detected in a separate detection channel 30. A total of N parallel detection channels are employed. FIG. 1 shows a first channel 30a, an intermediate channel i 30b and a last channel N 30c.

In the example of FIG. 1, each channel 30 comprises an amplifier 32 which receives a signal component from the relevant electrical frequency mixer 26. The amplified output from the amplifier 32 is delivered to an electrical detector 34 (microwave detector) where the signal component is detected. The electrical detector 34 can be a square law detector so that the signal component is converted to a quasi-DC signal that indicates the amount of electrical energy present in the frequency band of the channel. The electrical detector 34 is followed by a second amplifier 36. Note that both amplifiers are optional.

Finally, the detected signal, once amplified by the amplifier 36, is delivered to an analog-to-digital converter 38. This operates to digitize the signal by sampling at a selected sampling rate (controllable by a clock 40 associated with the converter 38) to generate a sequence of digital samples representing the signal component for that channel 30. The samples are stored in a memory block 42; the memory blocks for all the channels 30 can together be considered to comprise a memory array.

The stored samples can be accessed by a processor 44 operable to process the samples so as to determine properties of the measured Brillouin spectral line. The properties may include the Brillouin frequency $f_B$, the linewidth of the spectral line, and the intensity of the spectral line. From these, the values of physical parameters in the environment of the optical fibre that affect the Brillouin shift, such as temperature, pressure, and strain, can be calculated using previously obtained calibration information. The correspondence between time and distance along the optical fibre 18 allows distributed measurements of the parameters to be obtained.

The time/distance correspondence means that the sampling rate in part determines the spatial resolution of the measurement along the length of the optical fibre. If the samples are considered individually, the spatial resolution is the inverse of the sampling rate (multiplied by a time-to-distance factor of approximately 10 ns per metre). Alternatively, the samples may be divided for processing into groups with respect to time, with the duration of the groups then determining the spatial resolution.

The frequency width of the channels also determines the spatial resolution of the measurements, so should be selected accordingly. For example, if a spatial resolution of 10 meters is required, each channel should preferably have a bandwidth of at least 3.5 MHz. The bandwidth should preferably also be less than the Brillouin linewidth, which is typically about 35 MHz. In practice, bandwidths of between about 10 MHz and 20 MHz are likely to be useful and practical. Once the bandwidth is selected, the number of channels N that will be required depends on the total frequency range to be covered, which in turn depends on the anticipated maximum Brillouin shift to be measured. For example, if a channel width of 15 MHz is chosen, together with a measurement span of 700 MHz, just under 48 channels should be used.

An advantage of dividing the primary signal into narrowband frequency channels is that each analog-to-digital converter has only to handle a small frequency range. This allows relatively slow converters to be used, which are compact, low power and relatively inexpensive. Sampling rates of 50 to 100 megasamples per second can be adequate. Integrated circuits, such as Analog Devices part number AD9222-65 are able to digitize eight such channels in a single device, thus simplifying the circuit design.

A further advantage is that sampling rates of this level can be readily collected by a field programmable gate array (FPGA) so that the processor can comprise one or more FPGAs, making for an inexpensive processor implementation. However, any suitable digital processing devices can be used, such as a conventional microprocessor. The processing may be achieved by processing the samples from the individual channels separately and combining the results afterwards, or the samples from all channels may be processed together. Also, any processing technique suitable for extracting the desired information from the samples can be used. For example, the data can be fitted to a Lorentzian spectral curve.

SECOND EXAMPLE EMBODIMENT

Figure 2:
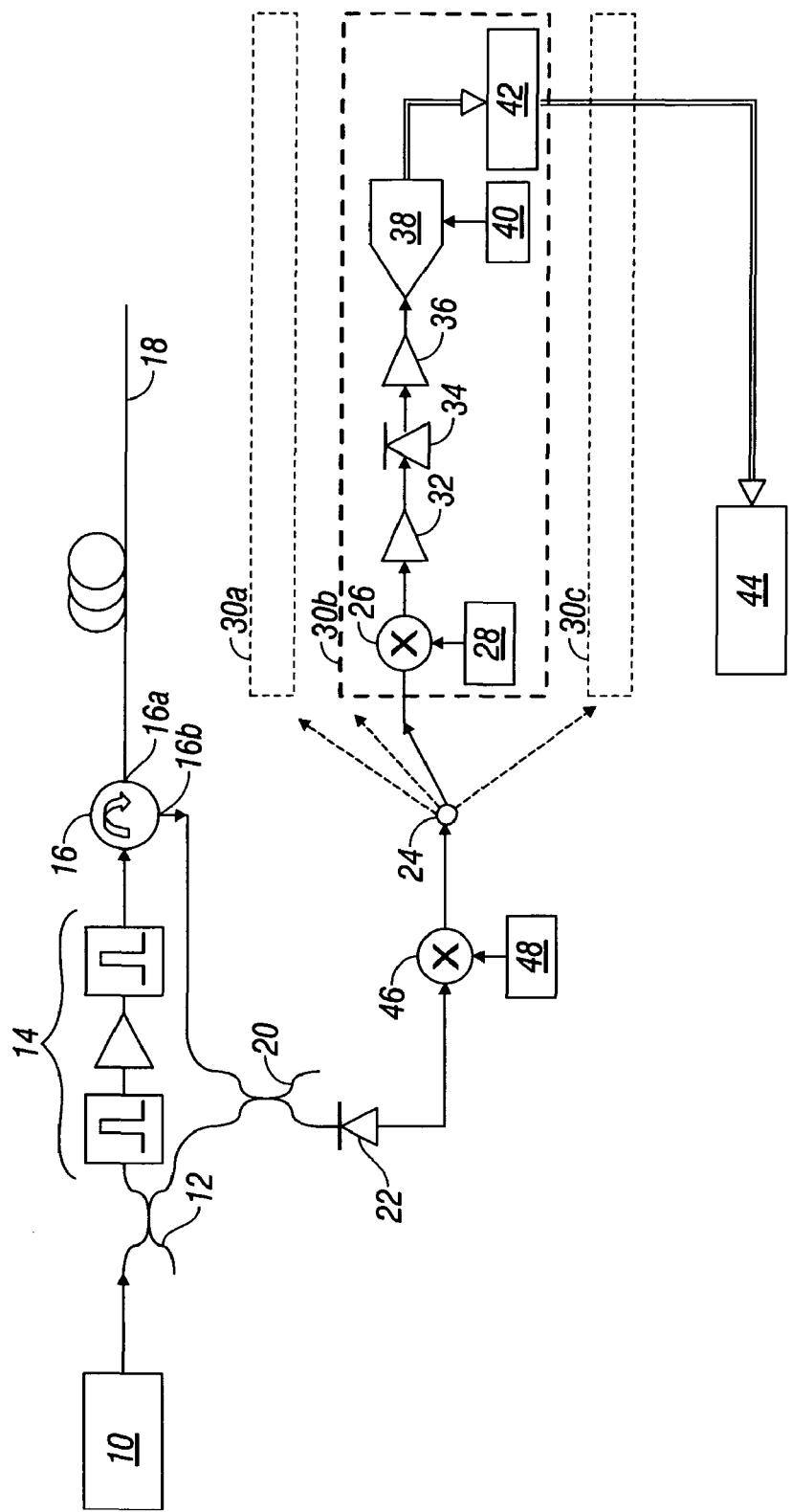
FIG. 2 shows a schematic representation of apparatus for carrying out a Brillouin backscatter measurement in accordance with a further embodiment of the present invention.

FIG. 2 shows a schematic representation of a second example of apparatus according to an embodiment of the present invention. This apparatus is substantially the same as that shown in FIG. 1, in that received backscattered light is frequency mixed with other light in an optical detector to produce an electrical difference frequency signal that is then split between a plurality of detection channels distinguished by frequency range, in which the signal is detected and digitized for signal processing.

However, the apparatus of FIG. 2 further includes a secondary electrical signal mixer 46 disposed between the optical detector 22 and the electrical signal splitter 24. Connected to the secondary electrical signal mixer 46 is a secondary electrical local oscillator 48 operable to generate a secondary electrical signal at a constant frequency $f_C$. The secondary electrical signal mixer 46 receives the primary electrical signal at $\Delta F(t)$ from the optical detector. The signal undergoes difference frequency mixing in the secondary electrical signal mixer 46 with the secondary electrical signal, to produce a difference frequency $\Delta F_2(t)=\Delta F(t)-f_C$. The new difference frequency $\Delta F_2(t)$ is less than the original difference frequency $\Delta F(t)$, so the frequency of the primary electrical signal is hence downconverted before being distributed for detection in the channels 30 by the electrical signal splitter 24. This reduction in frequency can be used to reduce noise in the system, thus improving measurement accuracy, and can also bring the frequency into a range more suitable for the detectors 34 and analog-to-digital converters 38 available for use in the detection channels 30. The constant frequency $f_C$ can therefore be selected accordingly. Any frequency reduction might be found useful, but a value of $\Delta F_2(t)$ of below 5 GHz is likely to be advantageous.

THIRD EXAMPLE EMBODIMENT

Figure 3:
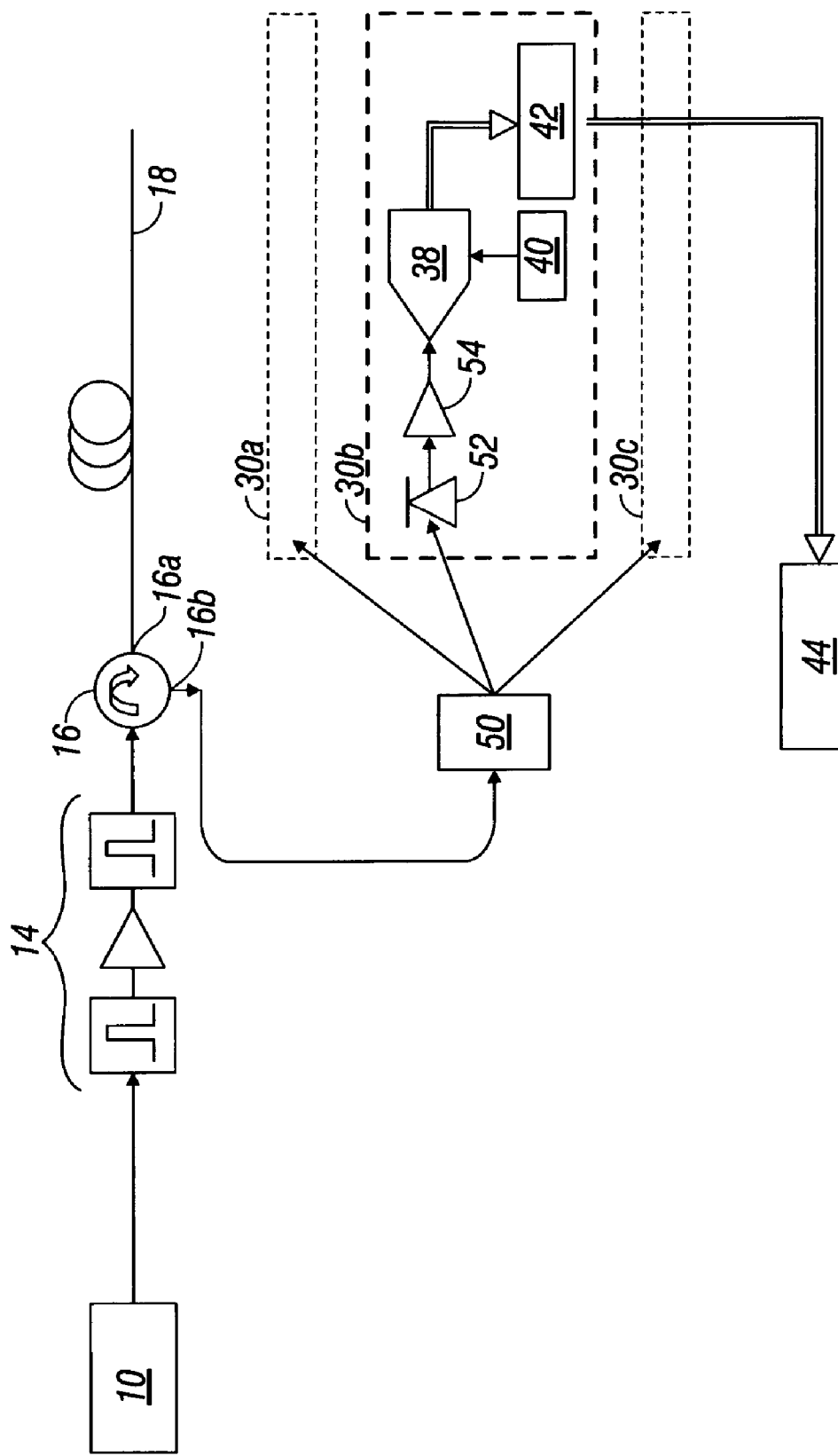
FIG. 3 shows a schematic representation of apparatus for carrying out a Brillouin backscatter measurement in accordance with a yet further embodiment of the present invention.

FIG. 3 shows a schematic representation of apparatus according to a further embodiment of the invention.

The embodiments of FIGS. 1 and 2 utilize an arrangement in which the received backscattered light is converted to an electrical signal by difference frequency mixing before detection. In contrast, FIG. 3 shows an apparatus in which the backscatter is retained in the optical domain for detection.

As in FIGS. 1 and 2, an optical source 10 generates coherent light at a frequency $f_0$ which is passed through a pulse forming unit 14 that produces probe pulses which are launched into a deployed optical fibre 18 via a first port 16a of an optical circulator 16. However, the returned Brillouin backscatter is not then mixed with another optical signal in an optical detector as in FIGS. 1 and 2. Instead, the second port 16b of the optical circulator 16 is arranged to deliver the backscattered light received from the optical fibre 18 along an optical beam path (defined by an optical fibre, for example) to an optical spectrally dispersive device 50, such as a spectrometer, filter group, grating group, or prism. Optionally, an optical amplifier may be inserted between optical circulator 16 and dispersive device 50 to boost the signal prior to division in dispersive device 50. The dispersive device 50 is configured to split the incoming light (where the received backscatter is itself directly used as a signal representative of the backscatter) according to frequency, so as to produce multiple signal components of the representative signal each having a different spectrum and hence each covering a different frequency band.

The dispersive device 50 is arranged to that each of the signal components is delivered to one of a plurality of parallel detection channels 30 for detection. Each channel 30 comprises an optical detector 52, which is illuminated with the light of the incident signal component for that channel and produces an electrical signal according to the amount of incident light (square law detector). The electrical signal is then amplified in an amplifier 54 (optional) before being passed to an analog-to-digital converter 38 for digitization by sampling, the samples being stored to a memory block 42 for processing in a processor 44, as in the previous embodiments.

Other Embodiments

The invention is not limited to the embodiments described with regard to FIGS. 1, 2, and 3. Any arrangement can be used in which a signal representing received Brillouin backscatter is divided into a plurality of signal components each having a different frequency band where the bands together cover the full frequency range of interest for the anticipated Brillouin shift, and each signal component is then handled in a separate detection channel comprising a detector and an analog-to-digital converter that samples the output of the detector. Suitable apparatus may be thought of as comprising a receiver section, which receives the backscattered light from the optical fibre and delivers a signal representative of the backscatter (which may be the backscattered light itself), a divider section, which splits the signal into multiple components having different frequency bands, and a detection section comprising a plurality of parallel detection channels, each of which receives one signal component. As exemplified by the various embodiments, the detection can be carried out on optical signals or electrical signals. Various frequency mixing stages may be included to shift the signal frequencies before splitting or detection, in addition to the specific examples described above. Also, various stages of filtering and amplifying of both optical and electrical signals may be used in addition to those already described (or the described stages can be omitted). In particular, embodiments in which the Brillouin backscatter is converted to an electrical signal before detection may include an electrical bandpass filter after the optical detector 22, to remove noise and frequencies outside the Brillouin range of interest from the signal before it is divided. Similarly, an optical bandpass filter may be placed before the dispersive device 50 in optical embodiments. The detectors, whether for optical or electrical detection, may be chosen to be the same for each channel, in which case adjustments may need to be made to compensate for differences in response at the different frequency ranges, or may be chosen to be different for the various channels so that each channel can be tailored to give an equivalent response regardless of its frequency range.

For any embodiment, it is possible to perform multiple measurement cycles, in which Brillouin backscatter from a plurality of probe pulses is detected, sampled, and stored. The data from all the pulses can then be averaged in the determination of the Brillouin properties and the physical parameters, to improve accuracy. Preferably, the samples for all the pulses are averaged for each channel, and then the averages for all the channels are processed together to determine the Brillouin properties.

Finally, the method of the present invention may be used in conjunction with an optical frequency-domain reflectometry (OFDR) arrangement. In OFDR, rather than sending a single pulse of light into a fibre and observing the time dependence of the backscattered light, a continuous wave source is frequency modulated, typically with a sinusoidal waveform the frequency of which is chirped over a wide frequency range. Provided that the spatial resolution is modest, the modulation applied can be at sufficiently low frequencies to avoid interfering with the channelization. Brillouin gain analysis, i.e. stimulated Brillouin scattering, is described in [6], but the principle is also applicable to spontaneous Brillouin scattering as has been discussed herein.

REFERENCES

[1] H. H. Kee, G. P. Lees and T. P. Newson, "*All-fiber system for simultaneous interrogation of distributed strain and temperature sensing by spontaneous Brillouin scattering*", Optics Letters, 2000, 25(10), pp 695-697.
[2] WO 2005/106396.
[3] T. Parker et al, "*Simultaneous distributed measurement of strain and temperature from noise-initiated Brillouin scattering in optical fibers*", IEEE Journal of Quantum Electronics, 1998, 34(4), pp 645-659.
[4] S. M. Maugham, H. H. Kee, and T. P. Newson, "*A calibrated 27-km distributed fiber temperature sensor based on microwave heterodyne detection of spontaneous Brillouin backscattered power*", IEEE Photonics Technology Letters, 2001, 13(5), pp 511-513.
[5] M. N. Alahbabi et al, "*High spatial resolution microwave detection system for Brillouin-based distributed temperature and strain sensors*" Measurement Science & Technology, 2004, 15(8), pp 1539-1543.
[6] Garus, D., et al., "*Distributed sensing technique based on Brillouin optical-fiber frequency-domain analysis*", Optics Letters 1996, 21(17): p. 1402.

What is claimed is:

1. A method for measuring Brillouin backscattering from an optical fibre comprising:
    launching a probe pulse of coherent light with frequency $f_0$ into an optical fibre;
    receiving backscattered light from the optical fibre that includes at least one Brillouin spectral line at a frequency $f_B(t)$ shifted from $f_0$ by a Brillouin shift, the Brillouin spectral line varying with time and distance along the fibre;
    obtaining a signal representative of the received backscattered light;
    dividing the signal into a plurality of signal components each having a different frequency band and delivering each signal component to a detection channel;
    in each detection channel:
        detecting the signal component using a detector to generate an electrical signal; and
        digitising the electrical signal using an analog-to-digital converter to sample the electrical signal and generate a sequence of digital samples representing the electrical signal; and
    processing the digital samples from the detection channels to determine one or more properties of the Brillouin spectral line of the received backscattered light as a function of time/distance along the optical fibre.

2. A method according to claim 1, in which:
    obtaining a signal representative of the received backscattered light comprises:
        providing coherent light at a frequency $f_1$; and
        mixing the received backscattered light at $f_B(t)$ with the coherent light at $f_1$ in an optical detector to generate a primary electrical signal at a difference frequency $\Delta F(t)=f_B(t)-f_1$, the primary electrical signal comprising the signal representative of the received backscattered light; and
    dividing the signal into a plurality of signal components comprises:
        dividing the primary electrical signal into a plurality of portions and difference frequency mixing each portion with a subsidiary electrical signal, each subsidiary electrical signal having a different constant frequency $f_{Ci}$ so that each portion acquires a frequency band.

3. A method according to claim 2, in which the difference frequency $\Delta F(t)$ is less than 100 GHz.

4. A method according to claim 2, in which $f_1=f_0$.

5. A method according to claim 4, comprising generating probe pulses at the frequency $f_0$ and the coherent light at the frequency $f_1$ from a single optical source, the output of which is modulated to produce probe pulses.

6. A method according to claim 2, comprising generating probe pulses from a first optical source and generating the coherent light at the frequency $f_1$ from a second optical source by modulating the output of one of the first optical source and the second optical source to generate modulation sidebands, and injection-locking the other of the first optical source and the second optical source to one of the modulation sidebands.

7. A method according to claim 2, further comprising, before the step of dividing the signal, mixing the primary electrical signal at the difference frequency $\Delta F(t)$ with a secondary electrical signal at a constant frequency $f_C$ to reduce the frequency of the primary electrical signal to a frequency $\Delta F_2(t)$ which is less than $\Delta F(t)$.

8. A method according to claim 7, in which the frequency $\Delta F_2(t)$ is less than 5 GHz.

9. A method according to claim 1, in which:
obtaining a signal representative of the received backscattered light comprises:
using the received backscattered light as the signal representative of the received backscattered light; and
dividing the signal into a plurality of signal components comprises:
spectrally dispersing the received backscattered light into a plurality of components each having a different spectral profile defining its frequency band.

10. The method according to claim 1, and further comprising repeating the method for further probe pulses, where the step of processing the digital samples includes, for each detection channel, averaging the samples over a plurality of probe pulses, before determining the one or more properties of the Brillouin spectral line from the averaged samples.

11. The method according to claim 1, in which the one or more properties of the Brillouin spectral line determined from the samples include at least one of: the Brillouin frequency $f_B(t)$; the intensity of the Brillouin spectral line; and the linewidth of the Brillouin spectral line.

12. The method according to claim 1, and further comprising calculating the value of one or more physical parameters to which the optical fibre is subject from the one or more determined properties of the Brillouin spectral line and converting time to distance along the optical fibre to obtain an indication of the distribution of the one or more physical parameters over the length of the optical fibre.

13. Apparatus for measuring Brillouin backscattering from an optical fibre comprising:
a first optical source operable to generate probe pulses of coherent light at a frequency $f_0$ and launch probe pulses into an optical fibre;
a receiver operable to receive backscattered light from the optical fibre that includes at least one Brillouin spectral line at a frequency $f_B(t)$ shifted from $f_0$ by a Brillouin shift, the Brillouin spectral line varying with time and distance along the fibre, and to deliver a signal representative of the received backscattered light;
a divider operable to divide the signal into a plurality of signal components each having a different frequency band and deliver each component to a detection channel, each detection channel comprising:
a detector operable to detect the signal component and generate an electrical signal; and
an analog-to-digital converter operable to digitise the electrical signal by sampling to generate a sequence of digital samples representing the electrical signal; and
a processor operable to process the digital samples from the detection channels to determine one or more properties of the Brillouin spectral line of the received backscattered light as a function of time/distance along the fibre.

14. Apparatus according to claim 13, in which:
the receiver comprises:
a second optical source operable to generate coherent light at a frequency $f_1$; and
an optical detector arranged to receive the backscattered light at $f_B(t)$ and the coherent light at $f_1$, and operable to generate a primary electrical signal at a difference frequency $\Delta F(t)=f_B(t)-f_1$, the primary electrical signal comprising the signal representative of the received backscattered light; and
the divider comprises:
an electrical signal splitter operable to divide the primary electrical signal into a plurality of signal portions;
a plurality of electrical local oscillators, each operable to generate a subsidiary electrical signal with a different constant frequency $f_{Ci}$;
a plurality of electrical signal mixers each arranged to receive one signal portion and one subsidiary electrical signal so as to difference frequency mix each signal portion with a different subsidiary electrical signal so that each signal portion acquires a different frequency band.

15. Apparatus according claim 14, in which the difference frequency $\Delta F(t)$ is less than 100 GHz.

16. Apparatus according to claim 14, in which $f_1=f_0$.

17. Apparatus according to claim 16, in which the first optical source and the second optical source are the same optical source, the output of which is modulated to produce pulses.

18. Apparatus according to claim 14, in which the output of one of the first optical source and the second optical source is modulated to generate modulation sidebands, and the other of the first optical source and the second optical source is injection-locked to one of the modulation sidebands.

19. Apparatus according to claim 14, further comprising a secondary electrical local oscillator operable to generate a secondary electrical signal at a constant frequency $f_C$, and a secondary electrical signal mixer operable to frequency mix the primary electrical signal at the difference frequency $\Delta F(t)$ with the secondary electrical signal to reduce the frequency of the primary electrical signal to a frequency $\Delta F_2(t)$ which is less than $\Delta F(t)$, before the primary electrical signal reaches the divider.

20. Apparatus according to claim 19, in which the frequency $\Delta F_2(t)$ is less than 5 GHz.

21. Apparatus according to claim 13, in which:
the divider comprises an optical spectrally dispersive device operable to disperse incident backscattered light into a plurality of components each having a different spectral profile defining its frequency band; and
the receiver comprises an optical path arranged to collect backscattered light from the optical fibre and deliver it to the optical spectrally dispersive device, the backscattered light itself comprising the signal representative of the received backscattered light.

22. Apparatus according to claim 13, in which the processor is further operable to average digital samples generated from a plurality of probe pulses for each detection channel, before determining the one or more properties of the Brillouin spectral line.

23. Apparatus according to claim 13, in which the one or more properties of the Brillouin shift determined from the digital samples include at least one of: the Brillouin frequency $f_B(t)$; the intensity of the Brillouin spectral line; and the linewidth of the Brillouin spectral line.

24. Apparatus according to claim 13, in which the processor is further operable to calculate the value of one or more physical parameters to which the optical fibre is subject from the one or more determined properties of the Brillouin shift and convert time into distance along the optical fibre to obtain an indication of the distribution of the one or more physical parameters over the length of the optical fibre.

* * * * *